United States Patent
Yamazaki (10) Patent No.: US 8,989,797 B2
(45) Date of Patent: Mar. 24, 2015

(54) RADIO COMMUNICATION SYSTEM, RADIO BASE STATION, AND POWER CONSUMPTION CONTROL METHOD

(75) Inventor: Chiharu Yamazaki, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 268 days.

(21) Appl. No.: 13/805,269

(22) PCT Filed: Jun. 15, 2011

(86) PCT No.: PCT/JP2011/063688
§ 371 (c)(1),
(2), (4) Date: Dec. 18, 2012

(87) PCT Pub. No.: WO2011/158857
PCT Pub. Date: Dec. 22, 2011

(65) Prior Publication Data
US 2013/0102354 A1    Apr. 25, 2013

(30) Foreign Application Priority Data
Jun. 18, 2010  (JP) .................................. 2010-140004

(51) Int. Cl.
*H04B 7/00*     (2006.01)
*H04W 52/02*    (2009.01)
*H04W 88/08*    (2009.01)
*H04W 92/20*    (2009.01)

(52) U.S. Cl.
CPC .......... *H04W 52/0206* (2013.01); *H04W 88/08* (2013.01); *H04W 92/20* (2013.01); *Y02B 60/50* (2013.01)
USPC ................................ 455/522; 455/68; 455/69

(58) Field of Classification Search
CPC . H04W 52/0206; H04W 88/08; H04W 92/20; Y02B 60/50
USPC ............................ 455/522, 68–70, 524, 525
See application file for complete search history.

(56) References Cited

U.S. PATENT DOCUMENTS

| 6,710,578 B1 * | 3/2004 | Sklovsky ....................... 320/127 |
| 7,073,079 B1 * | 7/2006 | Karsi et al. .................... 713/320 |
| 8,560,025 B2 * | 10/2013 | Kim et al. ..................... 455/574 |

(Continued)

FOREIGN PATENT DOCUMENTS

| JP | 2006-101442 A | 4/2006 |
| JP | 2006-340008 A | 12/2006 |
| JP | 2006-352477 A | 12/2006 |
| JP | 2008-193240 A | 8/2008 |
| WO | 2010/050885 A1 | 5/2010 |

OTHER PUBLICATIONS

An Office Action; "Notice of Reasons for Rejection," issued by the Japanese Patent Office on Feb. 25, 2014, which corresponds to Japanese Patent Application No. 2010-140004 and is related to U.S. Appl. No. 13/805,269; with English language statement of relevance.

(Continued)

*Primary Examiner* — Dominic E Rego
(74) *Attorney, Agent, or Firm* — Studebaker & Brackett PC (57) ABSTRACT

Wireless base station eNB10-1 sets the power consumption level of wireless base station eNB10-1 (itself) to one of multiple levels, and sends a power consumption level information message indicating the power consumption level to wireless base station eNB10-2. Wireless base station eNB10-2 receives and stores the power consumption level information message.

8 Claims, 4 Drawing Sheets

(56) References Cited

U.S. PATENT DOCUMENTS

| | | | | |
|---|---|---|---|---|
| 8,855,087 | B2* | 10/2014 | Banerjee et al. | 370/338 |
| 2002/0022455 | A1* | 2/2002 | Salokannel et al. | 455/68 |
| 2004/0003303 | A1* | 1/2004 | Oehler et al. | 713/300 |
| 2007/0121634 | A1* | 5/2007 | Anderson | 370/392 |
| 2008/0132298 | A1* | 6/2008 | Roh et al. | 455/574 |
| 2008/0165715 | A1* | 7/2008 | Liu | 370/311 |
| 2010/0022242 | A1* | 1/2010 | Nizri et al. | 455/435.2 |
| 2010/0038342 | A1* | 2/2010 | Lim et al. | 216/41 |
| 2010/0120476 | A1* | 5/2010 | Zettler et al. | 455/574 |
| 2010/0226295 | A1* | 9/2010 | Sun et al. | 370/294 |
| 2011/0201339 | A1 | 8/2011 | Kuningas | |
| 2012/0289284 | A1 | 11/2012 | Kuningas | |

OTHER PUBLICATIONS

3GPP TR 25.927 V0.0.3 (May 2010); 3rd Generation Partnership Project; Technical Specification Group Radio Access Network; Solutions for energy saving within UTRA Node B; (Release 10); pp. 1-16.

3GPP TR 36.902 V9.1.0 (Mar. 2010); 3rd Generation Partnership Project; Technical Specification Group Radio Access Network; Evolved Universal Terrestrial Radio Access Network (E-UTRAN); Self-configuring and self-optimizing network (SON) use cases and solutions (Release 9); pp. 1-23.

International Search Report; PCT/JP2011/063688; Sep. 6, 2011; with translation.

* cited by examiner

RADIO COMMUNICATION SYSTEM, RADIO BASE STATION, AND POWER CONSUMPTION CONTROL METHOD

TECHNICAL FIELD

The present invention relates to a radio communication technology, and more particularly, relates to a radio communication system, a radio base station, and a power consumption control method, employing SON.

BACKGROUND ART

In an LTE (Long Term Evolution) being standardized in 3GPP (3rd Generation Partnership Project) which is a group aiming to standardize a radio communication system, a technology called SON (Self Organizing Network) is employed. According to the SON, it is expected to automatize the installation or maintenance of a radio base station, which does not require a field measurement or setting by personnel (for example, refer to Non Patent Literature 1).

In the SON, there has been proposed a technique of suppressing power consumption by controlling on/off of power of a radio base station (called "eNB" in the 3GPP). Such a technique is termed "Energy Savings". In the energy savings, when the power of the radio base station eNB is turned on, the radio base station eNB notifies another radio base station eNB that the power of the radio base station eNB is turned on. Furthermore, when turning on the power of another radio base station eNB, the radio base station eNB notifies the other radio base station eNB that the power of the other radio base station eNB is turned on.

However, in the aforementioned energy savings technique, it is not possible to meet demands for suppressing power consumption as much as possible and achieve efficiency, also when the power of the radio base station eNB is turned on.

CITATION LIST

Non-Patent Literature

[Non-Patent Literature 1] 3GPP TR 36.902 V9.1.0 March, 2010.

SUMMARY OF INVENTION

A radio communication system (radio communication system 1) according to a first feature includes a first radio base station (radio base station eNB 10-1) and a second radio base station (radio base station eNB 10-2). The first radio base station comprises: a control unit (power consumption setting unit 121) that performs control of setting power consumption of the first radio base station to one of multi-step levels; and a first transmission unit (X2 interface communication unit 140) that transmits, to the second radio base station, level information on a level, set by the control unit, of the power consumption of the first radio base station. The second radio base station comprises: a first reception unit (X2 interface communication unit 190) that receives the level information from the first radio base station; and a storage unit (storage unit 230) that stores the level information received by the first reception unit.

According to the above feature, the first radio base station sets its own power consumption to multi-step levels, and more efficient control of the power consumption of a radio base station is thereby enabled because it is possible to suppress power consumption stepwise, as compared with the case of simply turning on the power at the time of the operation of the first radio base station. Furthermore, the second radio base station receives level information on the power consumption level of the first radio base station, thereby recognizing the power consumption level of the first radio base station, as a result of which it becomes possible to control its own power consumption stepwise on the basis of the power consumption level of the first radio base station. In this regard also, it is possible to efficiently control the power consumption of the radio base station.

In the first feature, the second radio base station comprises: a second transmission unit (X2 interface communication unit 190) that transmits, to the first radio base station, level instruction information on instruction for changing the level of the power consumption of the first radio base station. The first radio base station comprises: a second reception unit (X2 interface communication unit 140) that receives the level instruction information from the second radio base station.

In the first feature, the second radio base station comprises: a change unit (other-station-power-consumption-level change unit 223) that changes the level of the power consumption of the first radio base station according to a number of radio terminals which are connected to the second radio base station and exist in a predetermined range from the first radio base station.

In the first feature, the second transmission unit transmits the level instruction information by a number of times corresponding to a power consumption level required for the first radio base station.

In the first feature the second transmission unit transmits the level instruction information including information on a power consumption level required for the first radio base station.

A power consumption control method according to a second feature is used in a radio base station which configures a radio communication system with other radio base station. The power consumption control method comprising: a step of setting, by the radio base station, power consumption of the radio base station to one of multi-step levels; and a step of transmitting from the radio base station to the other radio base station, level information on a set level of the power consumption of the radio base station.

A radio base station according to a third feature configures a radio communication system with other radio base station. The radio base station comprising: a reception unit that receives level information from the other radio base station; and a storage unit that stores the level information received by the reception unit. The level information includes information on a level of power consumption of the other radio base station.

A power consumption control method according to a fourth feature is used in a radio communication system including a first radio base station and a second radio base station. The power consumption control method a step of setting, by the first radio base station, power consumption of the first radio base station to one of multi-step levels; a step of transmitting, from the first radio base station to the second radio base station, level information on a set level of the power consumption of the first radio base station; a step of receiving, by the second radio base station, the level information from the first radio base station; and a step of storing, by the second radio base station, the received level information.

DESCRIPTION OF EMBODIMENTS

Next, an embodiment of the present invention will be described with reference to the drawings. Specifically, (1) Overview of LTE system, (2) Configuration of radio communication system, (3) Configuration of radio base station, (4) Operation of radio communication system, (5) Operation and effect, and (6) Other embodiments will be described. It is to be noted that the same or similar reference numerals are applied to the same or similar parts through the drawings in the following embodiments.

(1) Overview of LTE System

Figure 1:
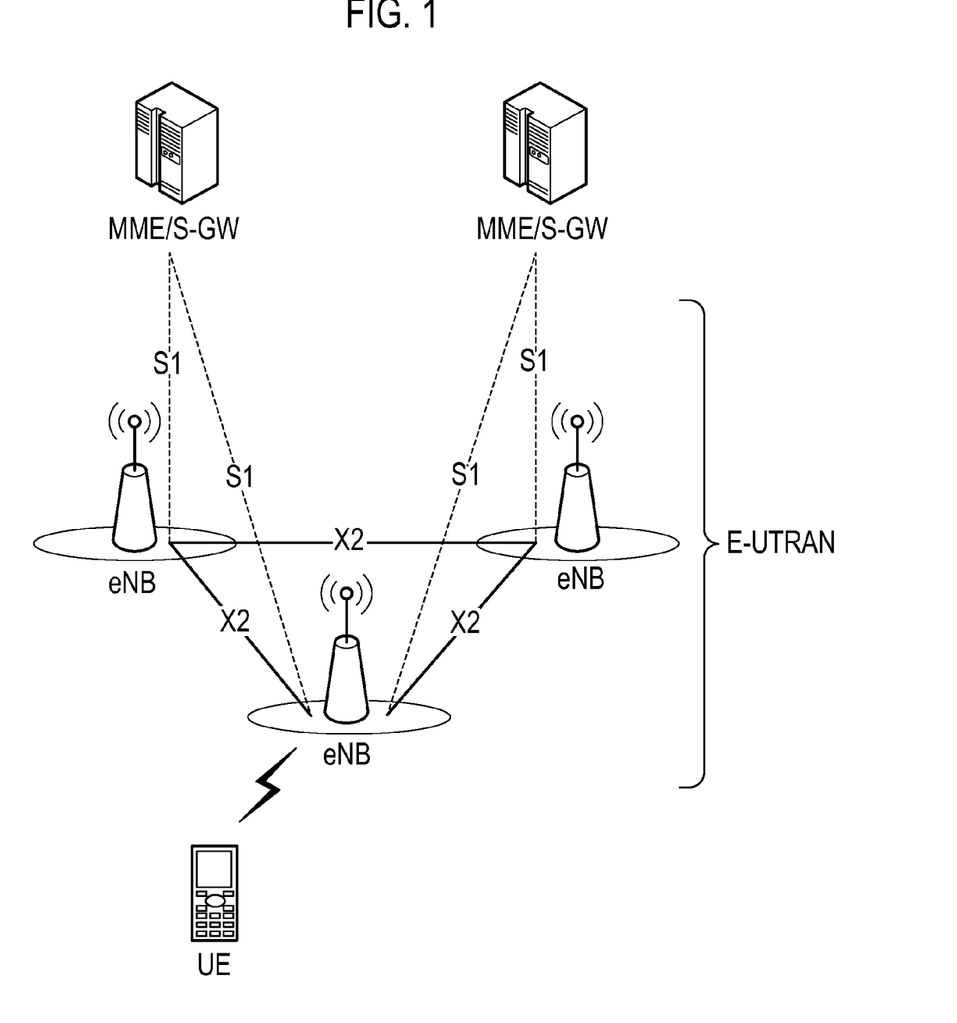
FIG. 1 is a diagram for explaining the overview of an LTE system.

FIG. 1 is a diagram for explaining the overview of an LTE system. As illustrated in FIG. 1, a plurality of radio base stations eNB constitute E-UTRAN (Evolved-UMTS Terrestrial Radio Access Network). Each of the plurality of radio base stations eNB forms a cell that is a range where radio waves travel.

A radio terminal UE is a radio communication device owned by a user, and is also called as "User Equipment". The radio terminal UE measures quality (that is, radio quality) of a radio signal received from a radio base station eNB, and transmits a report (hereinafter, a measurement result report) of a measurement result of the radio quality to a radio base station eNB to which the radio terminal UE is connected.

Such radio quality includes reference signal received power (RSRP), signal-to-interference noise ratio (SINR) and the like. The measurement result report related to the RSRP is called a measurement report, and the measurement result report related to an index of the SINR is called CQI (Channel Quality Indicator).

Furthermore, the radio base station eNB, to which the radio terminal UE is connected, assigns a resource block, which is an assignment unit of a radio resource, to the radio terminal UE on the basis of the CQI received from the radio terminal UE. Moreover, the radio base station eNB, to which the radio terminal UE is connected, determines a modulation class to be used in radio communication with the radio terminal UE, on the basis of the CQI received from the radio terminal UE. The modulation class is a combination of a modulation level and a coding rate.

The radio base stations eNB are capable of communicating with one another through an X2 interface which is a logical communication path through which it is possible to communicate among base stations. Each of the plurality of radio base stations eNB can communicate with the EPC (Evolved Packet Core), more specifically, with the MME (Mobility Management Entity)/S-GW (Serving Gateway) via an S1 interface.

(2) Configuration of Radio Communication System

Figure 2:
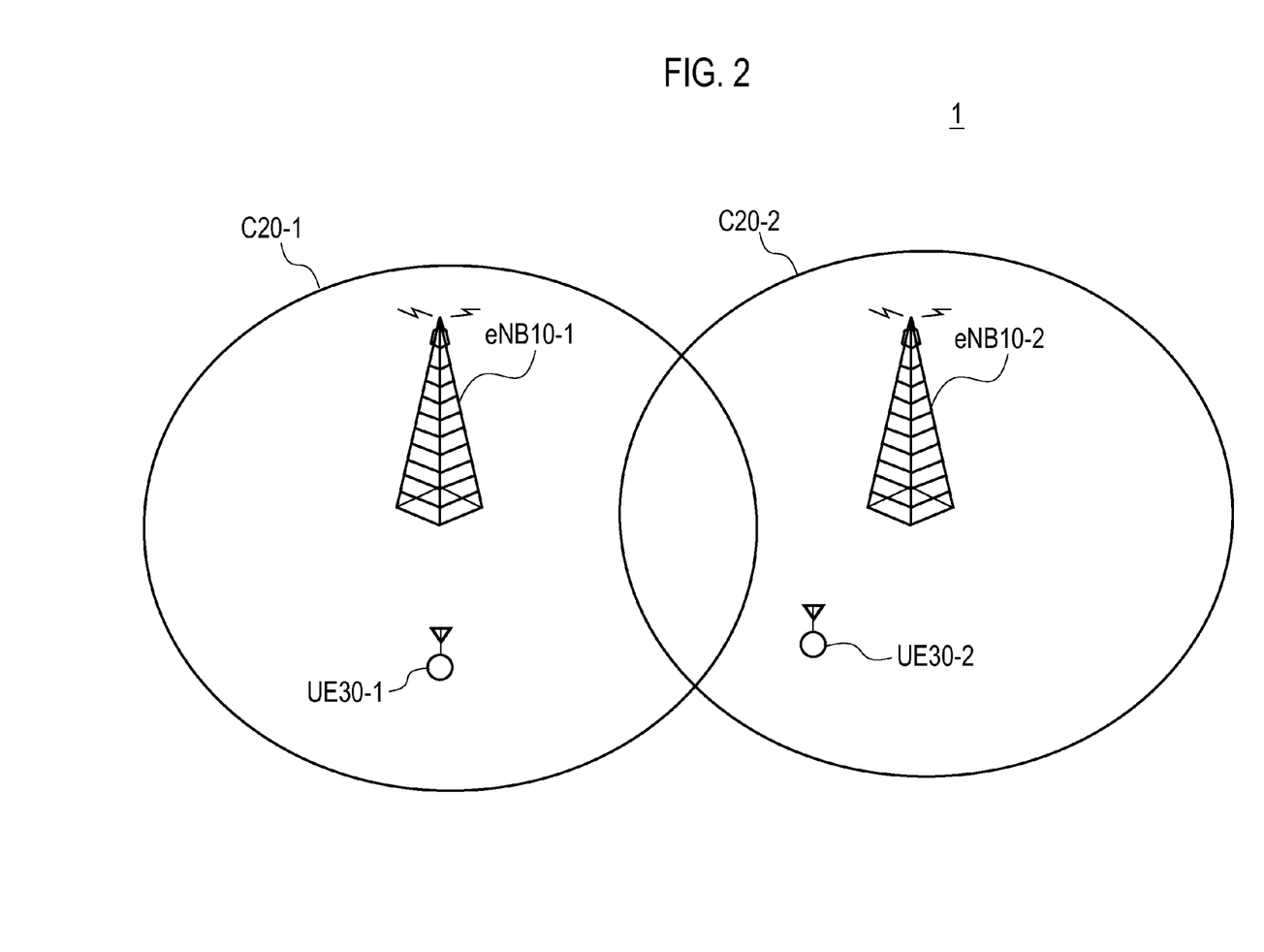
FIG. 2 is a schematic configuration diagram of a radio communication system according to an embodiment of the present invention.

As illustrated in FIG. 2, a radio communication system 1 includes a radio base station eNB10-1 forming a cell C20-1 and a radio base station eNB10-2 forming a cell C20-2. Furthermore, the radio communication system 1 includes a radio terminal UE30-1 in the cell C20-1 and a radio terminal UE30-2 in the cell C20-2.

In the present embodiment, as the power consumption of the radio base station eNB10-1 is larger, the transmission power of the radio base station eNB10-1 is larger, so that the cell C20-1 is wider. Similarly, as the power consumption of the radio base station eNB10-2 is larger, the transmission power of the radio base station eNB10-2 is larger, so that the cell C20-2 is wider.

The radio base station eNB10-1 performs radio communication with the radio terminal UE30-1 in the cell C20-1, and the radio base station eNB10-2 performs radio communication with the radio terminal UE30-2 in the cell C20-2.

The radio base station eNB10-1 and the radio base station eNB10-2 are capable of communication to each other by using the aforementioned X2 interface.

In addition, FIG. 2 illustrates one radio terminal UE30-1 and one radio terminal UE30-2 only, respectively; however, there exist a plurality of radio terminals UE30-1 and a plurality of radio terminals UE30-2. In the present embodiment, the radio base station eNB10-1 corresponds to a first radio base station and the radio base station eNB10-2 corresponds to a second radio base station.

(3) Configuration of Radio Base Station

Figure 3:
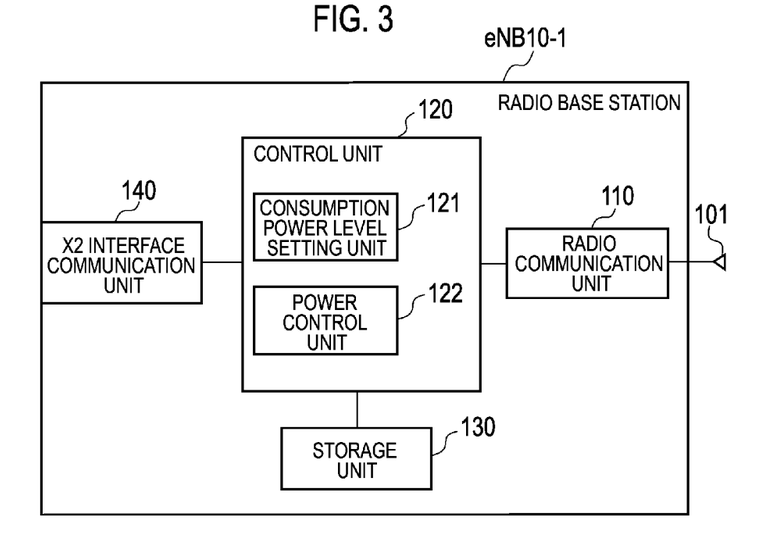
FIG. 3 is a block diagram illustrating a first configuration of a radio base station according to the embodiment of the present invention.

Next, the configuration of the radio base station eNB10-1 will be described. FIG. 3 is a block diagram illustrating the configuration of the radio base station eNB10-1 according to the present embodiment.

As illustrated in FIG. 3, the radio base station eNB10-1 includes an antenna 101, a radio communication unit 110, a control unit 120, a storage unit 130, and an X2 interface communication unit 140.

The antenna 101 is used for transmitting and receiving a radio signal. The radio communication unit 110 includes, for example, a radio frequency (RF) circuit and a baseband (BB) circuit, and transmits and receives a radio signal to and from the radio terminal UE30-1 through the antenna 101. Furthermore, the radio communication unit 110 modulates a transmission signal and demodulates a reception signal.

The control unit 120 is configured by using a CPU, for example, and controls various functions provided in the radio base station eNB10-1. The storage unit 130 is configured by using a memory, for example, and stores various types of information used for the control and the like of the radio base station eNB10-1. The X2 interface communication unit 140 communicates with the radio base station eNB10-2, that is, communicates between the radio base stations, by using the X2 interface.

The control unit 120 includes a power consumption level setting unit 121 and a power control unit 122.

The power consumption level setting unit 121 sets the power consumption of its own radio base station eNB10-1 to one of multi-step levels. Furthermore, the power consumption level setting unit 121 is able to set, initiated by various states, a power consumption level. For example, when a worker performed an operation for setting power consumption with respect to an operation unit (not illustrated), the power consumption level setting unit 121 sets the power consumption level on the basis of an operation signal from the operation unit. Furthermore, when an external MME transmitted power consumption level information, the power consumption level setting unit 121 sets the power consumption level on the basis of the received power consumption level information. Furthermore, the power consumption level setting unit 121 detects the number of radio terminals UE30-1 connected to the radio base station eNB10-1, and sets the power consumption level such that power consumption is larger as the number of the radio terminals The power consumption level setting unit 121 outputs a message including information on the set power consumption level (a power consumption level information message) to the X2 interface communication unit 140. The X2 interface communication unit 140 transmits the input power consumption level information message to the radio base station eNB10-2 through the X2 interface.

Then, there may exist a case in which the X2 interface communication unit 140 receives a message of information on instruction for increasing a power consumption level (a power consumption level instruction information message) from the radio base station eNB10-2, which will be described later, through the X2 interface. In this case, the X2 interface communication unit 140 outputs the received power consumption level instruction information message to the control unit 120.

The power consumption level setting unit 121 increases the power consumption level to the power consumption level indicated by the input power consumption level instruction information message. Alternatively, the power consumption level setting unit 121 increases the power consumption level to a power consumption level corresponding to the number of inputs (the number of times received) of the power consumption level instruction information message.

The power control unit 122 controls the power of its own radio base station eNB10-1, thereby controlling the power consumption of the radio base station eNB10-1 to the power consumption level set by the power consumption level setting unit 121.

Figure 4:
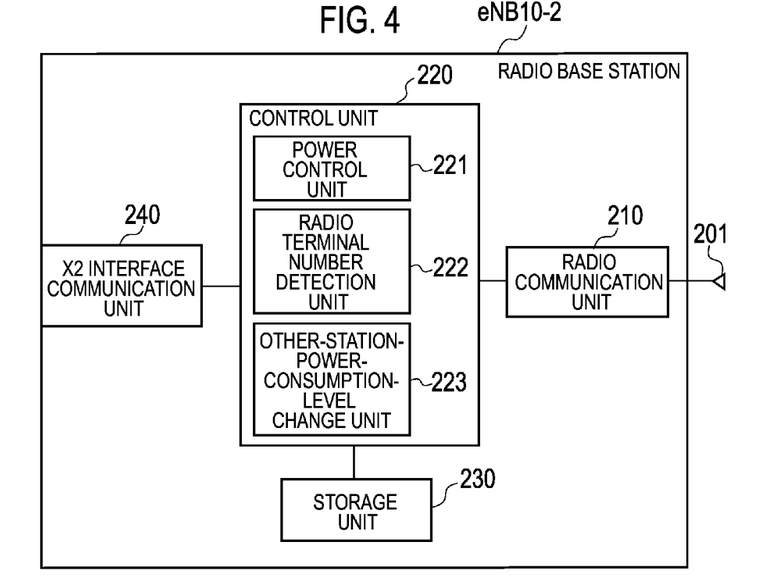
FIG. 4 is a block diagram illustrating a second configuration of the radio base station according to the embodiment of the present invention.

Next, the configuration of the radio base station eNB10-2 will be described. FIG. 4 is a block diagram of the configuration of the radio base station eNB10-2 according to the present embodiment.

As illustrated in FIG. 4, the radio base station eNB10-2 includes an antenna 201, a radio communication unit 210, a control unit 220, a storage unit 230, and an X2 interface communication unit 240.

The antenna 201 is used for transmitting and receiving radio signals. The radio communication unit 210 includes, for example, a radio frequency (RF) circuit and a baseband (BB) circuit, and transmits and receives a radio signal to and from the radio terminal UE30-2 through the antenna 201. Furthermore, the radio communication unit 210 modulates the transmission signal and demodulates the reception signal.

The control unit 220 is configured by using a CPU, for example, and controls various functions provided in the radio base station eNB10-2. The storage unit 230 is configured by using a memory, for example, and stores various types of information used for the control and the like of the radio base station eNB10-2. The X2 interface communication unit 240 communicates with the radio base station eNB10-1, that is, communicates between the radio base stations, by using the X2 interface.

The control unit 220 includes a power control unit 221, a radio terminal number detection unit 222, and an other-station-power-consumption-level change unit 223.

The X2 interface communication unit 240 receives the power consumption level information message from the radio base station eNB10-1 through the X2 interface. Moreover, the X2 interface communication unit 240 outputs the power consumption level information message to the control unit 220.

The control unit 220 stores the input power consumption level information message in the storage unit 230.

The power control unit 221 recognizes the power consumption level of the radio base station eNB10-1, which is indicated by the power consumption level information message stored in the storage unit 230. Moreover, the power control unit 221 controls the power of its own radio base station eNB10-2 on the basis of the power consumption level of the radio base station eNB10-1, thereby controlling the power consumption of the radio base station eNB10-2 to an optimal value. Furthermore, the size of the cell C20-1 is uniquely determined by the power consumption level of the radio base station eNB10-1. The size of the cell C20-2 needs to be determined such that no dead zone is generated. The optimal value indicates the power consumption of the radio base station eNB10-2, which is required in order to form the cell C20-2 with the size enough for preventing the dead zone from being generated.

Then, when intending to suppress the power consumption of the radio base station eNB10-2, for example, when it is necessary to temporarily perform the degeneration operation of the radio base station eNB10-2 in order to perform the maintenance of the radio base station eNB10-2, the following processes are performed.

The radio terminal number detection unit 222 receives a measurement report, which is transmitted from the radio terminal UE30-2 connected to its own radio base station eNB10-2, through the antenna 201 and the radio communication unit 210.

Based on the measurement report, the radio terminal number detection unit 222 detects the number of radio terminals UE30-2 which are connected to the radio base station eNB10-2 and exist in a predetermined range from the radio base station eNB10-1.

Specifically, the radio terminal number detection unit 222 extracts reference signal received power (RSRP) from the radio base station eNB10-1 among reference signal received powers (RSRP) included in measurement reports from the radio terminals UE30-2. Moreover, when the reference signal received power (RSRP) from the radio base station eNB10-1 is equal to or more than a predetermined value, the radio terminal number detection unit 222 designates radio terminals UE30-2, which are transmission sources of corresponding measurement reports, as the radio terminals UE30-2 which are connected to the radio base station eNB10-2 and exist in the predetermined range from the radio base station eNB10-1, and calculates the number of the radio terminals UE30-2. Furthermore, the predetermined value, for example, indicates the reference signal received power (RSRP) from the radio base station eNB10-1, which is assumed in an area in the direction of the radio base station eNB10-1 in an outer edge of the cell C20-2.

The other-station-power-consumption-level change unit 223 determines whether the number (hereinafter, referred to as the number of detected radio terminals) of the radio terminals UE30-2 detected by the radio terminal number detection unit 222 is equal to or more than a predetermined threshold value.

When the number of detected radio terminals is equal to or more than the threshold value, the other-station-power-consumption-level change unit 223 determines whether the power consumption level of the radio base station eNB10-1, which is indicated by the power consumption level information message from the radio base station eNB10-1, is the maximum level of multi-step levels. Furthermore, information on the maximum level has been previously stored in the storage unit 230.

When the power consumption level of the radio base station eNB10-1 is not the maximum level, the other-station-power-consumption-level change unit 223 changes the power consumption level of the radio base station eNB10-1 to be increased by a predetermined step. Specifically, the other-station-power-consumption-level change unit 223 increases the power consumption level of the radio base station eNB10-1 such that the degree of the increase is large as the number of the detected radio terminals is large. However, the other-station-power-consumption-level change unit 223 prevents the increased power consumption level of the radio base station eNB10-1 from exceeding the aforementioned maximum level.

The other-station-power-consumption-level change unit 223 generates a message including the increased power consumption level (the power consumption level instruction information message) of the radio base station eNB10-1. Moreover, the other-station-power-consumption-level change unit 223 outputs the power consumption level instruction information message to the X2 interface communication unit 240. The X2 interface communication unit 240 transmits the input power consumption level instruction information message to the radio base station eNB10-1 through the X2 interface.

Alternatively, the other-station-power-consumption-level change unit 223 outputs the power consumption level instruction information message to the X2 interface communication unit 240 by the number of times corresponding to the increased power consumption level of the radio base station eNB10-1. As the increased power consumption level of the radio base station eNB10-1 is larger, the number of outputs of the power consumption level instruction information message is larger. Whenever the power consumption level instruction information message is input, the X2 interface communication unit 240 transmits the power consumption level instruction information message to the radio base station eNB10-2 through the X2 interface.

(4) Operation of Radio Communication System

Figure 5:
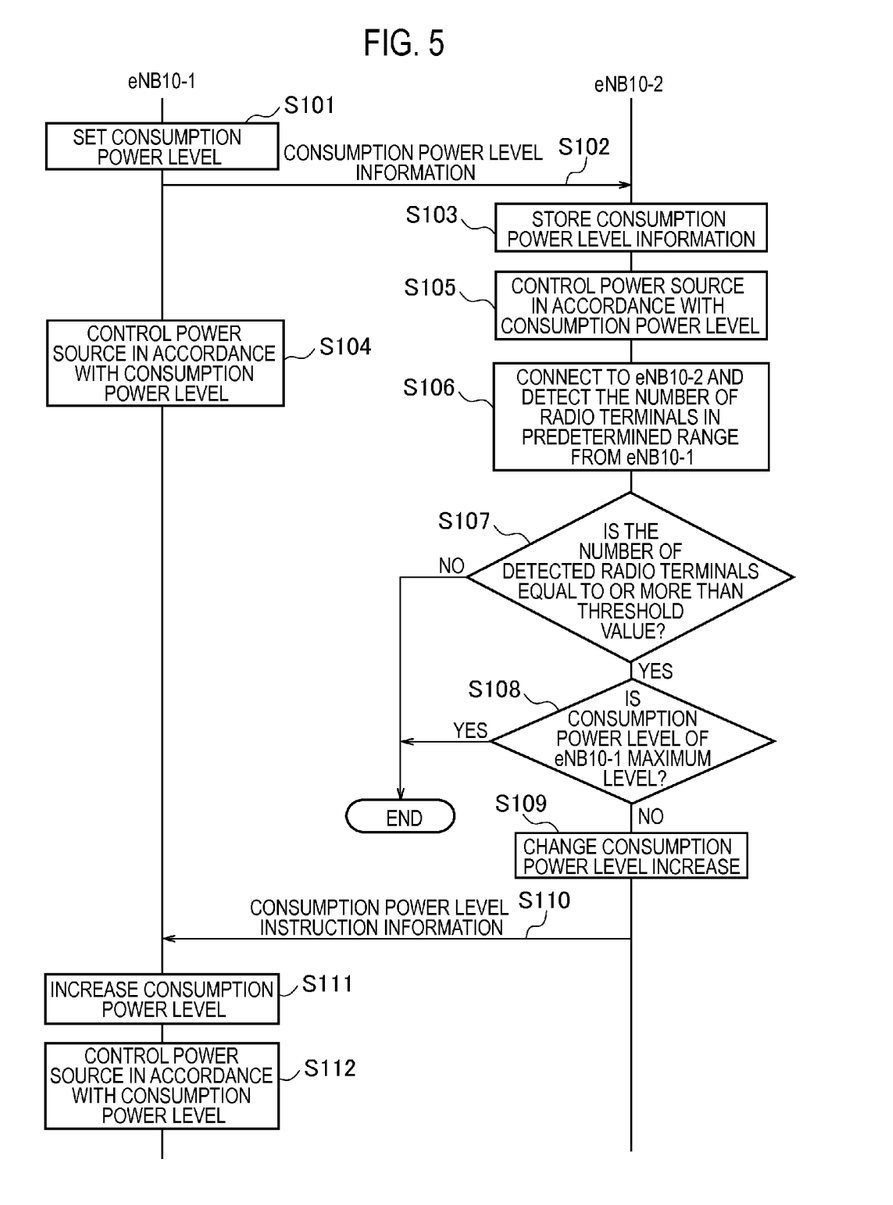
FIG. 5 is an operation sequence diagram illustrating an operation of the radio communication system according to the embodiment of the present invention.

FIG. 5 is an operation sequence diagram illustrating the operation of the radio communication system 1 according to the present embodiment.

In step S101, the power consumption level setting unit 121 of the radio base station eNB10-1 sets the power consumption of its own radio base station eNB10-1 to one of multi-step levels.

In step S102, the X2 interface communication unit 140 of the radio base station eNB10-1 transmits a message of information on the set power consumption level (a power consumption level information message) to the radio base station eNB10-2 through the X2 interface. The X2 interface communication unit 240 of the radio base station eNB10-2 receives the power consumption level information message.

In step S103, the control unit 220 of the radio base station eNB10-1 stores the power consumption level information message in the storage unit 230.

In step S104, the power control unit 122 of the radio base station eNB10-1 controls the power of its own radio base station eNB10-1, thereby controlling the power consumption of the radio base station eNB10-1 to the power consumption level set in step S101.

In step S105, the power control unit 221 of the radio base station eNB10-2 controls the power of its own radio base station eNB10-2 on the basis of the power consumption level of the radio base station eNB10-1, thereby controlling the power consumption of the radio base station eNB10-2, the power consumption level being indicated by the power consumption level information message stored in the storage unit 230.

In step S106, the radio terminal number detection unit 222 of the radio base station eNB10-2 detects the number of radio terminals UE30-2 which are connected to the radio base station eNB10-2 and exist in a predetermined range from the radio base station eNB10-1.

In step S107, the other-station-power-consumption-level change unit 223 of the radio base station eNB10-2 determines whether the number (the number of detected radio terminals) of the radio terminals UE30-2 detected in step S106 is equal to or more than a predetermined threshold value.

When the number of detected radio terminals is smaller than the threshold value, a series of operations are completed. Meanwhile, when the number of detected radio terminals is equal to or more than the threshold value, the other-station-power-consumption-level change unit 223 of the radio base station eNB10-2 determines whether the power consumption level of the radio base station eNB10-1, which is indicated by the power consumption level information message from the radio base station eNB10-1, is the maximum level, in step S108.

When the power consumption level of the radio base station eNB10-1 is the maximum level, a series of operations are completed. Meanwhile, when the power consumption level of the radio base station eNB10-1 is not the maximum level, the other-station-power-consumption-level change unit 223 of the radio base station eNB10-2 changes so that the power consumption level of the radio base station eNB10-1 increases, in step S109.

In step S110, the X2 interface communication unit 240 transmits the power consumption level instruction information message, which indicates the increased power consumption level of the radio base station eNB10-1, to the radio base station eNB10-1 through the X2 interface. The X2 interface communication unit 140 of the radio base station eNB10-1 receives the power consumption level instruction information message.

In step S111, the power consumption level setting unit 121 of the radio base station eNB10-1 increases the power consumption level to the power consumption level indicated by the input power consumption level instruction information message.

In step S112, the power control unit 122 of the radio base station eNB10-1 controls the power of its own radio base station eNB10-1, thereby controlling the power consumption of the radio base station eNB10-1 to the increased power consumption level set by the power consumption level setting unit 121.

(5) Operation and Effect

As described above, according to the present embodiment, the radio base station eNB10-1 sets its own power consumption level to one of multi-step levels, and transmits a power consumption level information message indicating the power consumption level to the radio base station eNB10-2. Meanwhile, the radio base station eNB10-2 receives and stores the power consumption level information message.

The power consumption of the radio base station eNB10-1 is set to the multi-step levels, and more efficient control of the power of the radio base station eNB10-1 is thereby enabled because it is possible to suppress power consumption stepwise, as compared with the case of simply turning on the power at the time of the operation of the radio base station eNB10-1. Furthermore, the radio base station eNB10-2 is able to recognize the power consumption level of the radio base station eNB10-1, and appropriately control its own power consumption on the basis of the power consumption level of the radio base station eNB10-1, thereby efficiently controlling the power consumption of the radio base station eNB10-2.

Furthermore, the radio base station eNB10-2 increases the power consumption level of the radio base station eNB10-1 according to the number of radio terminals UE30-2 which are connected to its own radio base station eNB10-2 and exist in a predetermined range from the radio base station eNB10-1, and transmits a power consumption level instruction information message to the radio base station eNB10-1, wherein the power consumption level instruction information message indicates the increased power consumption level of the radio base station eNB10-1. Meanwhile, the radio base station eNB10-1 increases its own power consumption level to the power consumption level indicated by the power consumption level instruction information message.

In this way, in response to the number of the radio terminals UE30-2 which are connected to the radio base station eNB10-2 and exist in the predetermined range from the radio base station eNB10-1, in other words, the number of radio terminals UE30-2 highly likely to be connected to the radio base station eNB10-1, it is possible for the radio base station eNB10-1 to control power consumption stepwise and efficiently control the power of the radio base station eNB10-1.

(6) Other Embodiments

Thus, the present invention has been described with the embodiment. However, it should not be understood that those descriptions and drawings constituting a part of the present disclosure limit the present invention. Further, various substitutions, examples, or operational techniques shall be apparent to a person skilled in the art on the basis of this disclosure.

In the aforementioned embodiment, the radio base station eNB10-2 detected the number of the radio terminals UE30-2 which are connected to its own radio base station eNB10-2 and exist in the predetermined range from the radio base station eNB10-1, based on the measurement report. However, the radio base station eNB10-2 may acquire the location information of radio terminals UE30-2 from a location management server (E-SLMC) (Refer to 3GPP TS36.305), which manages the locations of radio terminals UE, or the radio terminals UE30-2, determine on the basis of the location information whether the radio terminals UE30-2 exist in the predetermined range from the radio base station eNB10-1, and detect the number of the radio terminals UE30-2 from a result of the determination.

Furthermore, in the aforementioned embodiment, the LTE system was described. However, the present invention may also be applied to other radio communication systems such as a radio communication system based on WiMAX (IEEE 802.16).

Thus, it must be understood that the present invention includes various embodiments that are not described herein. Therefore, the present invention is limited only by the specific features of the invention in the scope of the claims reasonably evident from the disclosure above.

In addition, the entire content of Japanese Patent Application No. 2010-140004 (filed on Jun. 18, 2010) is incorporated in the present specification by reference.

[Industrial Applicability]

According to the present invention, it is possible to provide a radio communication system, a radio base station, and a power control method, by which it is possible to efficiently control the power consumption of a radio base station.

The invention claimed is:

1. A radio communication system including a first radio base station and a second radio base station, wherein
   the first radio base station comprises:
   a control unit that performs control of setting power consumption of the first radio base station to one of multi-step levels; and
   a first transmission unit that transmits, to the second radio base station, level information on a level, set by the control unit, of the power consumption of the first radio base station, and
   the second radio base station comprises:
   a first reception unit that receives the level information from the first radio base station; and
   a storage unit that stores the level information received by the first reception unit.

2. The radio communication system according to claim 1, wherein
   the second radio base station comprises:
   a second transmission unit that transmits, to the first radio base station, level instruction information on instruction for changing the level of the power consumption of the first radio base station, and
   the first radio base station comprises:
   a second reception unit that receives the level instruction information from the second radio base station.

3. The radio communication system according to claim 2, wherein
   the second radio base station comprises:
   a change unit that changes the level of the power consumption of the first radio base station according to a number of radio terminals which are connected to the second radio base station and exist in a predetermined range from the first radio base station.

4. The radio communication system according to claim 2, wherein
   the second transmission unit transmits the level instruction information by a number of times corresponding to a power consumption level required for the first radio base station.

5. The radio communication system according to claim 2, wherein
   the second transmission unit transmits the level instruction information including information on a power consumption level required for the first radio base station.

6. A power consumption control method used in a radio base station which configures a radio communication system with other radio base station, comprising:
   a step of setting, by the radio base station, power consumption of the radio base station to one of multi-step levels; and
   a step of transmitting from the radio base station to the other radio base station, level information on a set level of the power consumption of the radio base station.

7. A radio base station which configures a radio communication system with other radio base station, comprising:
   a reception unit that receives level information from the other radio base station; and
   a storage unit that stores the level information received by the reception unit, wherein
   the level information includes information on a level of power consumption of the other radio base station.

8. A power consumption control method used in a radio communication system including a first radio base station and a second radio base station, comprising:
- a step of setting, by the first radio base station, power consumption of the first radio base station to one of multi-step levels;
- a step of transmitting, from the first radio base station to the second radio base station, level information on a set level of the power consumption of the first radio base station;
- a step of receiving, by the second radio base station, the level information from the first radio base station; and
- a step of storing, by the second radio base station, the received level information.

\* \* \* \* \*